US008688821B2

(12) United States Patent
Ballard et al.

(10) Patent No.: US 8,688,821 B2
(45) Date of Patent: Apr. 1, 2014

(54) AUTOMATIC TRANSMISSION OF SUPPORT INFORMATION FROM STORAGE APPARATUS

(75) Inventors: Curtis C. Ballard, Eaton, CO (US); Kelly J. Reasoner, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1869 days.

(21) Appl. No.: 11/259,224

(22) Filed: Oct. 26, 2005

(65) Prior Publication Data

US 2007/0094382 A1  Apr. 26, 2007

(51) Int. Cl.
*G06F 15/16* (2006.01)
*H04L 12/26* (2006.01)

(52) U.S. Cl.
CPC ............. *H04L 43/04* (2013.01); *H04L 43/06* (2013.01); *H04L 43/08* (2013.01)
USPC ............................................ 709/224; 714/39

(58) Field of Classification Search
CPC .......... H04L 43/04; H04L 43/06; H04L 43/08
USPC ........................................................ 709/224
See application file for complete search history.

(56) References Cited

U.S. PATENT DOCUMENTS 6,552,868 B1    4/2003  Suzuki
6,710,962 B1 *  3/2004  Caverly et al. ............... 360/69
6,985,877 B1 *  1/2006  Hayward et al. ............. 705/7.41
2004/0017633 A1  1/2004  Oohara et al.
2004/0044731 A1 * 3/2004  Chen et al. ................... 709/203

OTHER PUBLICATIONS

Tivoli Storage Management Concepts, 2003, Redbooks, http://pvmehta.com/new/TSM-Concept.pdf, pp. 30, 39, 184-185, 242, 277-279, 280-282, 284-285 and 289.*
Windows XP Error Reports, 2004, PC Magazine, http://web.ebscohost.com/ehost/pdf?vid=4&hid=16&sid=00cd48b8-0525-4d3f-8270-b8aed4204b79%40sessionmgr2.*
Tivoli Storage Management Concepts, 2003, Redbooks, http://pvmehta.com/new/TSM-Concept.pdf, pp. 36, 318 and 428.*
IBM Tivoli Storage Management Concepts ("IBM Tivoli Storage Management Concepts", IBM, 2003, pp. 1-486, especially pp. xxi, 30, 39, 184-185, 242, 277-279, 280-282, 284-285 and 289(hereinafter Tivoli).*
Windows XP Error Reports ("Windows XP Error Reports", PC Magazine, Feb. 2004, p. 1).*

* cited by examiner

*Primary Examiner* — Jude Jean Gilles
*Assistant Examiner* — Jaren M Means

(57) ABSTRACT

Backup storage apparatus and related methods that are operative to transmit error logs to a support organization. A controller controls and monitors a robotics assembly that loads and unloads storage media into and from storage devices. An operator control panel coupled to the controller controls functions of and displays information regarding the apparatus. An interface component communicates between the controller and a support organization. An algorithm displays a menu item for requesting that error logs be sent to the support organization, and transmits a request to the component to query the storage devices to generate a support ticket comprising error logs associated with the storage devices, combine the support tickets into a single composite file for transmission, and transmit the composite file to the support organization.

17 Claims, 4 Drawing Sheets

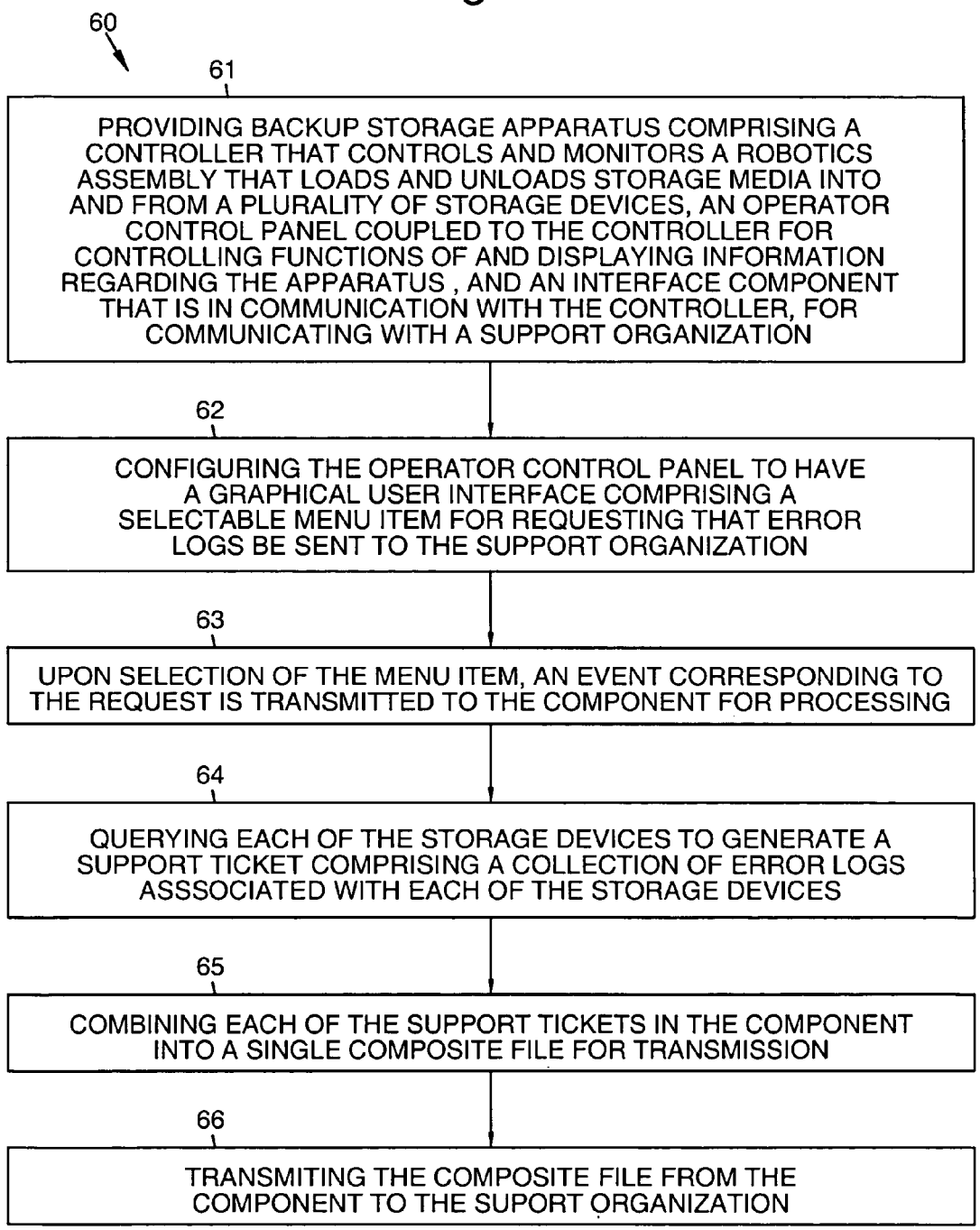

AUTOMATIC TRANSMISSION OF SUPPORT INFORMATION FROM STORAGE APPARATUS

BACKGROUND

Businesses, governmental agencies, learning institutions, and other organizations typically operate computers that are interconnected by a network. Network users often store data on hard drives of network servers. Users also store data on their host computers.

Data stored on the network and/or host computers is typically backed-up periodically to create a copy of the data to prevent it from being lost due to mechanical failure or accidental deletion, for example, and/or to produce an archive of the data. Backup operations typically involve storing a copy of all or a portion of the data files on the network and/or host computers to a backup device such as a magnetic tape library having a plurality of magnetic tape drives.

Digital magnetic tape has long been used for data storage in computer systems. The low cost-per-bit stored, long-term retention capability, and portability of magnetic tape cartridges have made them invaluable for storing large quantities of data generated by businesses.

Tape cartridges are used by automated tape library devices. Tape libraries generally handle many tape cartridges to store very large amounts of data. The tape libraries hold the tape cartridges in predefined positions or media slots. When data is required from a particular tape cartridge, a host system communicates via a Small Computer System Interface (SCSI) bus or a Fibre Channel (FC) fabric, for example, with a controller of the tape library. The controller retrieves the particular tape cartridge from its media slot and places the tape cartridge in a tape drive. The host system may then read from or write to the tape cartridge via the tape drive. Also, the host system may query the controller to determine the number of tape cartridges, tape drives, and robotics mechanisms contained in the tape library to manage the tape library.

There are a number of manufacturers of tape libraries that back up and store large quantities of data to digital magnetic tape cartridges. For example, a STORAGEWORKS brand of tape libraries are manufactured in various sizes and configurations. The number of tape cartridges that can be loaded into such tape libraries varies depending upon model, but may be on the order of 400-500 tapes, for example.

A typical tape library usually has a control and display panel where local functions are controlled and where the health of the tape library may be displayed. The display typically presents information about components in the tape library that are built by the original library manufacturer. However, additional value added components may be installed in the tape library including software tools to aid in the configuration, installation, and management of the tape library.

It is sometimes necessary to send a complete log report from a tape library to a support facility. One way to do this is to install a software tool (such as HP STORAGEWORKS LIBRARY AND TAPE TOOLS) on a server with direct connect access to the tape library, and use that tool to collect a support ticket. After the support ticket is collected, it can be emailed to the support facility.

However, installing software on a customer's backup server with a data connection (SCSI) to the tape library is often difficult because the customer does not want to risk installing software that may cause problems. Also, even when the software can be installed, there may not be a single server with connection to all drives and the library. Also, even if the software is installed and the support ticket can be pulled, backup servers usually are not configured to send email, so the support ticket must be transferred to another system and then sent manually.

A Command View web interface or command line interface may be employed to connect to the tape library from a network to pull the support ticket.

The main problem with this approach is that once the support ticket is pulled, it has to be manually emailed, and the ticket is typically large, so it has to be sent in multiple pieces. Often not all pieces are sent, and even when they are, the subject line of the email is not standard, so there is no easy way to match the email transmissions to each other and to the tape library. This approach also requires the customer to go through several steps to collect the data and the customer must wait a long time to complete the task.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 3 is a flow diagram that illustrates an exemplary method or algorithm.

DETAILED DESCRIPTION

Backup storage apparatus 10 is disclosed and is discussed below in the context of a magnetic tape library 10. However, it is to be understood that the backup storage apparatus 10 is not limited only to magnetic tape libraries, but may be employed in the context of other backup storage devices and systems, including optical drives and hard disk drives, for example.

Figure 1:
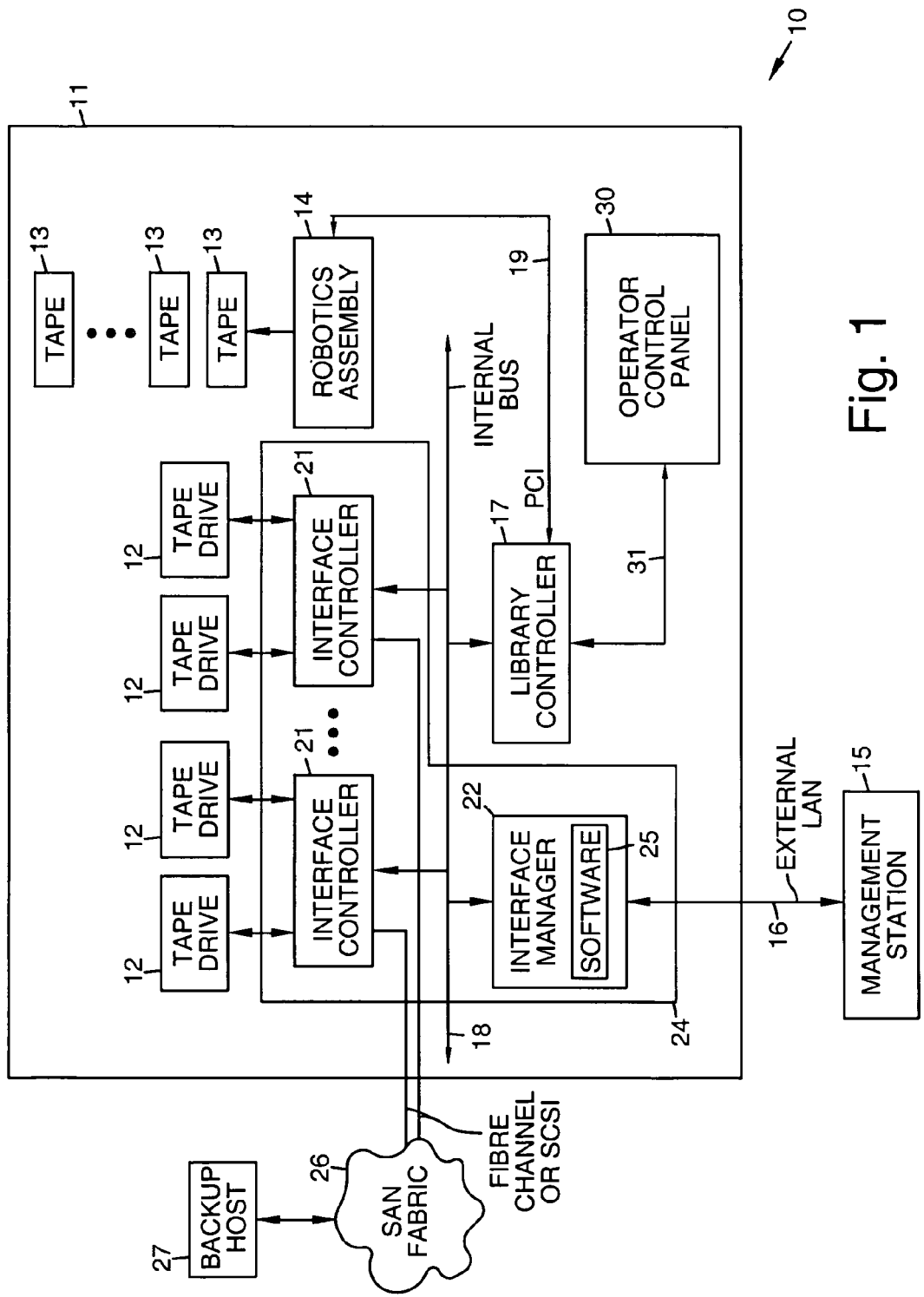
FIG. 1 is a block diagram that illustrates an exemplary tape library.

Referring to the drawing figures, FIG. 1 illustrates an exemplary backup storage apparatus 10 comprising an exemplary tape library 10. The exemplary tape library 10 comprises a housing 11 in which a plurality of tape drives 12 (storage devices 12) are housed. A plurality of tape cartridges 13 (storage media 13) are loaded and stored in the housing 11 and which are manipulated by a robotics assembly 14 to load and unload them into a selected tape drive 12 to store data thereon or retrieve data therefrom. In other types of backup storage apparatus 10, the storage devices 12 would comprise optical disk drives or hard disk drives, while the storage media 13 for would comprise optical disks or hard disk media, for example.

An external management station 15 communicates with the tape library 10 by way of an external local area network (LAN) 16. The management station 15 is coupled by way of the external LAN 16 to a component 22 of the tape library 10 such as an interface manager 22 or management appliance 22. The interface manager 22 or management appliance 22 includes software tools 25 that aid in the configuration, installation, and management of the tape library 10, and specifically allow configuration and control of value added components 24 of the tape library 10. The interface manager 22 is coupled to an internal bus 18 comprising a communication link 18.

One or more interface controllers 21 are coupled between selected tape drives 12 and the internal bus 18. The interface controllers 21 provide a communication path for the interface manager 22 to talk to the tape drives 12. The interface controllers 21 also provide a controlled data path between the tape drives 12 and a backup server 27 or host 27. The backup server 27 communicates with the interface controllers 21 via a Fibre Channel fabric 26, shown in FIG. 1 as a storage area network (SAN) fabric 26, for example. A parallel data bus such as a Small Computer System Interface (SCSI) bus may be used in place of the Fibre Channel fabric 26, but this is not commonly used in current-generation computers.

A library controller 17 is coupled by way of the internal bus 18 (communication link 18) to the one or more interface controllers 21 and to the interface manager 22 or management appliance 22. The library controller 17 is also coupled by the way of a private internal bus such as a PCI bus 19 to the robotics assembly 14.

The communication link 18 facilitates a general purpose information sharing protocol that extends the functionality of the tape library 17. To this end, the communication link 18 and information sharing protocol are used to register the library controller 17 with the interface manager 22 so that communication between the two devices is established. Registration is used herein to mean that communication is established between the interface manager 22 and the library controller 17. Such communication may be in the form of polls, for example, or any other mechanism to communicatively connect the interface manager 22 and the library controller 17. Thus, while the exemplary communication link 18 and information sharing protocol are discussed in terms of registration, it is to be understood that any communication arrangement that allows the interface manager 22 and the library controller 17 to identify and communicate with each other may be employed. Once the interface manager 22 is registered (i.e., communication is establish), the information sharing protocol and communication link 18 allow the operator control panel 30 to control functions of and display information regarding the interface manager 22.

The tape library 10 comprises an operator control panel and display system 30, referred to as an operator control panel 30 or OCP 30, which is preferably disposed on a front panel of the tape library 10, for ease of use. The operator control panel 30 controls local functions and displays information regarding the health of the tape library 10. The operator control panel 30 presents information about components in the tape library 10 that are built by the original library manufacturer.

The operator control panel 30 may be coupled to the library controller 17, and is used to control functions of and display information regarding the tape library 10 in addition to components in the tape library 10 that are installed by the original library manufacturer. In particular the operator control panel 30 may be used to control functions of the interface manager 22 and display information known to it and to the interface controllers.

The communication link 18 and information sharing protocol cooperate to register the library controller 17 with the interface manager 22. Once registered, the interface manager 22 and the library controller 17 communicate over the internal bus 18 using shared data objects having a shared format (i.e., a format shared by the interface manager 22 and library controller 17). The interface manager 22 and library controller 17 share their respective lists of objects corresponding to services that they provide. In this way, the interface manager 22 discovers services that are provided by the library controller 17 and vice-versa. The library controller 17 uses the shared data objects sent by the interface manager 22 to generate information that is to be displayed on the OCP 30. Furthermore, communication between the interface manager 22 and the library controller 17 via the information sharing protocol and communication link 18 allow the operator control panel 30 to control functions of the interface manager 22 and display information heretofore only available to the interface manager 22.

Figure 2A:
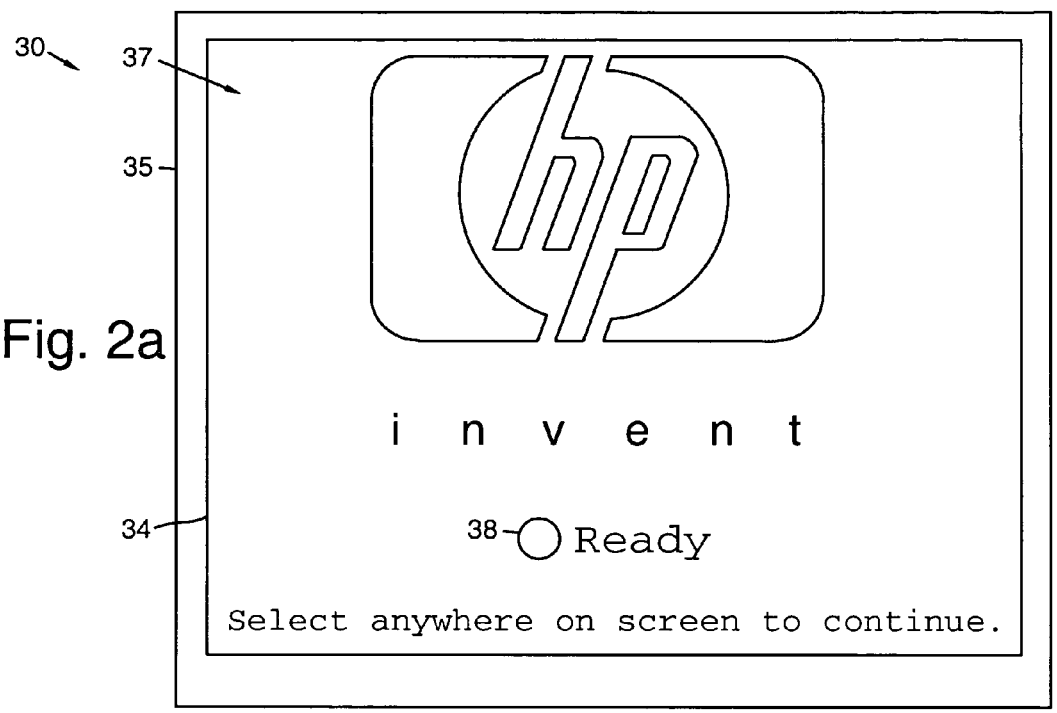
FIGS. 2a-2d illustrate exemplary display screens that implement support information transmission from a backup storage device.
Figure 2B:
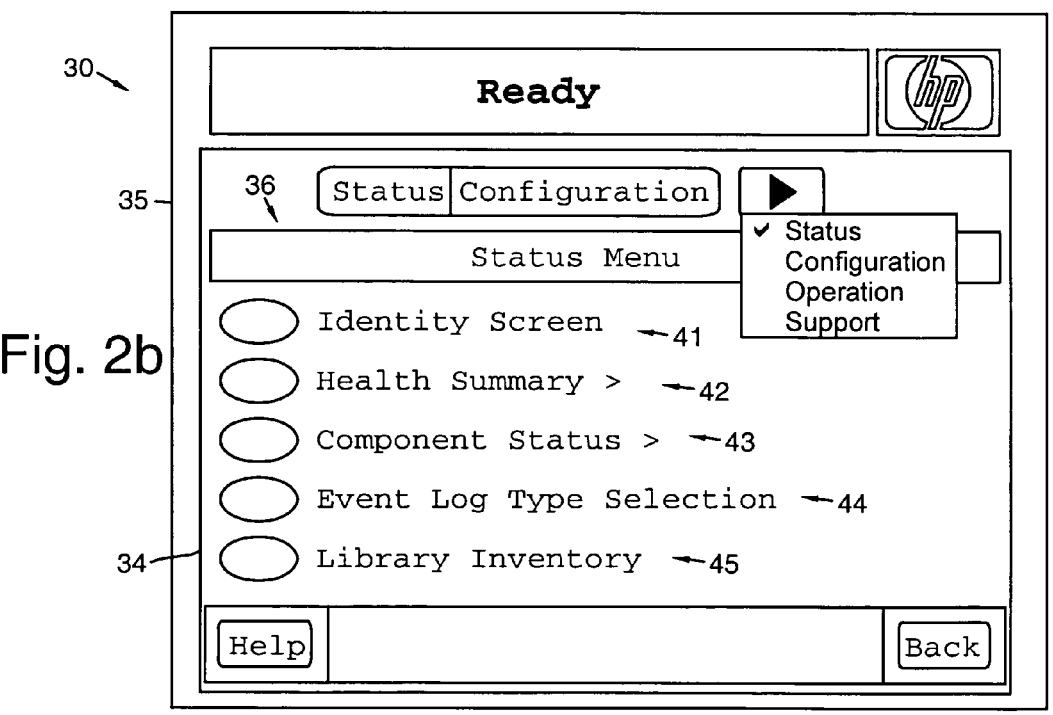
Figure 2C:
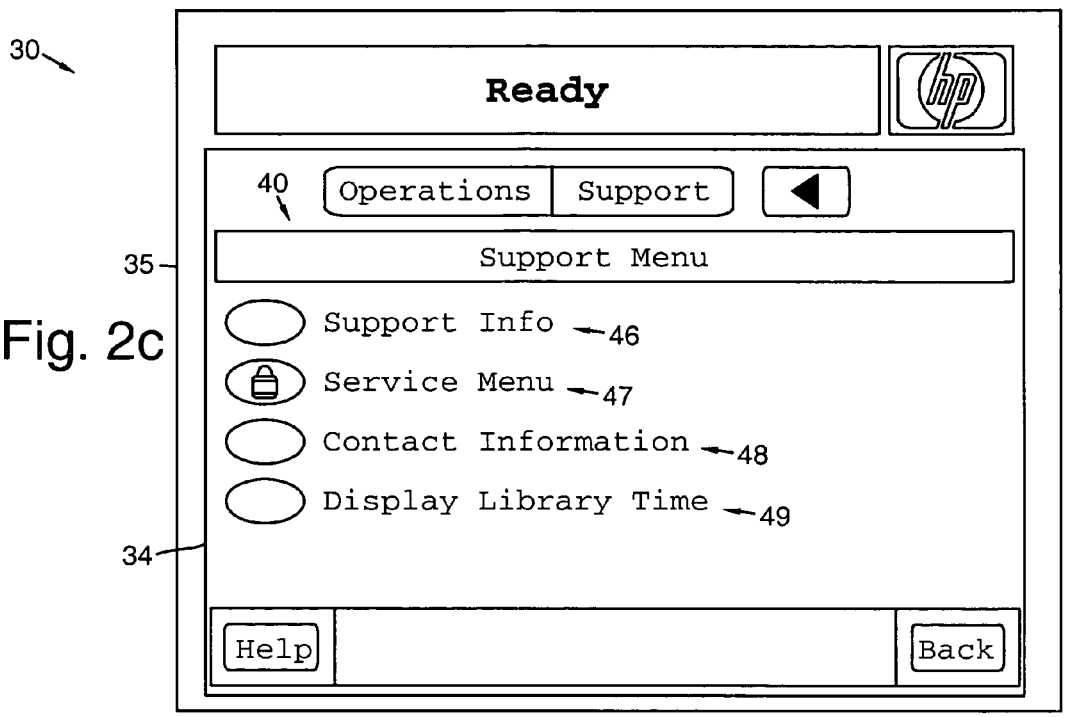
Figure 2D:
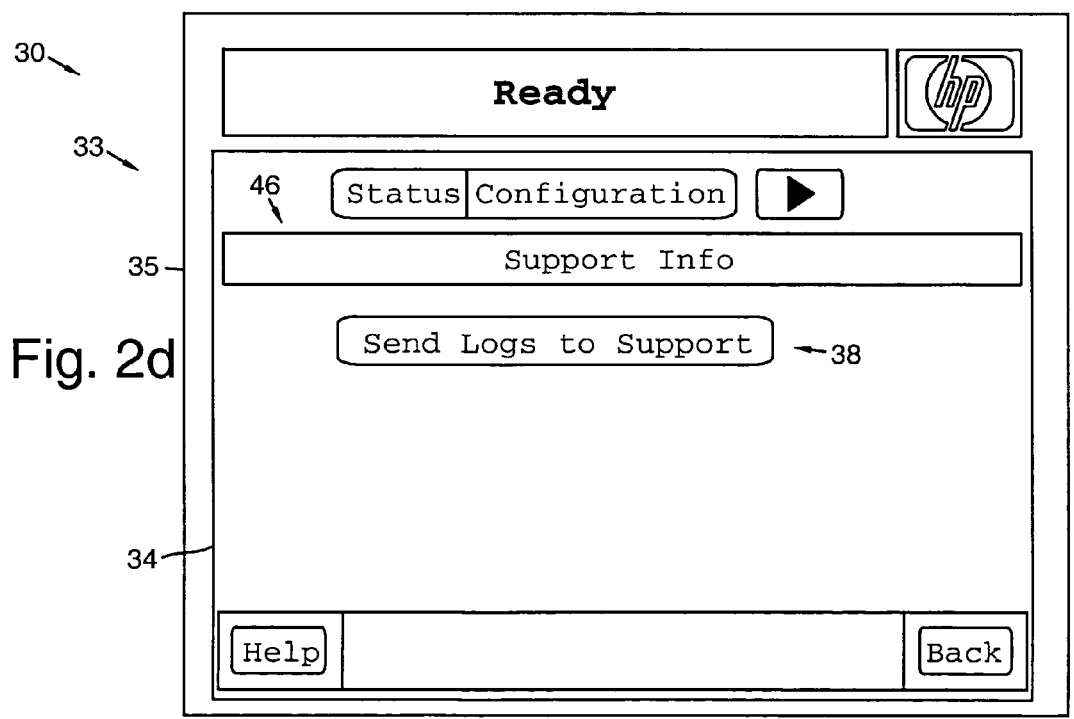

FIGS. 2a-2d illustrate exemplary display screens 34 that may be displayed on exemplary backup storage apparatus 10. FIGS. 2a-2c are exemplary display screens 34 through which a user may migrate to provide support information transmission for the backup storage device 10. FIG. 2d is a display screen 34 that may specifically be used to implement support information transmission from the backup storage device 10 to a support organization. The exemplary screen displays 34 and support information transmission function 33 may be presented on a display screen 35 of the operator control panel 30. The operator control panel 30 is thus configured to provide easy and quick navigation to pertinent menu levels to arrive at a display screen that permits transmission of the support information to the support organization.

The exemplary support information transmission function 33 is implemented by way of a support menu 40 (FIG. 2c) that is one menu of a menu structure or tree. The operator control panel 30 has a menu structure that has many paths, such as is illustrated by multiple menus 34 shown in FIGS. 2a-2d, of which the support menu 40 is but one.

FIG. 2a shows an exemplary screen display 34 comprising an initial splash screen 37 showing a logo. Clicking on the screen display 34 takes the user of a subsequent screen display 34, shown in FIG. 2b.

The screen display 34 shown in FIG. 2b may be used to present Status, Configuration, Operation and Support information to the user. The user may display the information contained in the Status, Configuration, Operation and Support menus by clicking on the appropriate button at the top of the screen, or by clicking on the right pointing arrow to select one of the screens that is not yet displayed (Operation and Support screens, in this case).

The status menu 36 shown in FIG. 2b comprises icons 41-45, selectable text, or a banner, for example, that allows the user to access and display an identity screen 41, a health summary screen 42, a component status screen 43, an event log type selection screen 44 comprising the support information transmission function 33, a library inventory screen 45, and other information that is not shown in FIG. 2b. Ellipses at the left side of the display screen 34 shown in FIG. 2b contain no icon, indicating that there are no problems. Status or warning icons may be displayed within the ellipses indicating that errors may be displayed by migrating to the particular screen display 34. Help and Back icons allow a user to access one or more help screens relating to what is displayed on the screen display 34, and to return to the previously displayed screen display 34.

FIG. 2c illustrates an exemplary Support menu 40, which is displayed by clicking on the Support button at the top of the screen shown in FIG. 2b, or by migrating to this screen using the right pointing arrow. The Support menu 40 shown in FIG. 2c allows the user to access support information 46, access a service menu 47, obtain contact information 48, and display library time 49, for example.

FIG. 2d shows the a screen display 34 to access support information 46. The Support Info icon 46 may be selected to transmit support information to the support organization. When the Support Info icon 46 is selected, the screen display 34 shown in FIG. 2d is presented. Selecting the "Send Logs to Support" icon 38, causes generation and transmission of support tickets to the support organization.

When a customer has a problem with their tape library 10, they must send a file with a collection of error logs (support ticket) to a support facility for processing. The tape library 10 is configured to allow a customer to make a request from the operator control panel 30 of the tape library 10 to generate a support ticket that is sent directly to the support facility without using any additional computer.

The operator control panel 30 of the tape library 10 implements a menu option to "Send Logs to Support", implemented using selection icon 38, button 38 or banner 38. The interface manager 22 has an event handler that accept the event transmitted from the operator-control panel 30 requesting that the logs be pulled and sent to the support organization. Events from the operator control panel 30 may be transmitted from the operator control panel 30 to the interface manager 22 using the information sharing protocol and shared data objects, for example.

When the "send logs" event is initiated by selecting the icon 38 presented on the display screen of the operator control panel 30, the interface manager 22 pulls a complete support ticket for all components in the tape library 10. The interface manager 22 pulls library support tickets from each of the tape drives 12. After a support ticket has been pulled for each tape drive 12, they are bundled and sent to the support organization via email, modem, or pager transmission, or the like. The Interface manager 22 automatically combines all library identifier information and generates a fixed format email subject if the support ticket is sent via email so that receipt of the logs is automated by looking for a particular subject format. An interface may be implemented in the Command View program, for example, where email system information may be provided to the interface manager 22 to provide for and configure email support.

One advantage of using this scheme is that backup applications are not shut down and there is no customer waiting. Once the process is started, the library 10 takes care of finding a safe time to generate the support tickets. Another advantage is that the log files sent to the support organization are correctly formatted with all required information so that the procedure needed to match the logs with a case is automated.

FIG. 3 is a flow diagram that illustrates an exemplary method 60 or algorithm 60 for use with backup storage apparatus 10. The exemplary method 60 or algorithm 60 may be used with storage apparatus 10 such as magnetic tape libraries, optical drives and hard disk drives, for example. The exemplary method 60 or algorithm 60 comprises the following actions.

Backup storage apparatus 10 is provided 61 that comprises a controller 17 that controls and monitors a robotics assembly 14 that loads and unloads storage media 13 into and from at least one storage device 12, an operator control panel 30 coupled to the controller 17 for controlling functions of and displaying information regarding the backup storage apparatus 10, and an interface component 22 that communicates with the controller 17 and with a support organization.

The operator control panel 30 is configured 62 to have a graphical user interface comprising a selectable menu item requesting that error logs be sent to the support organization. Upon selection of the menu item, an event corresponding thereto is transmitted 63 to the component 22 for processing. The component 22 queries 64 each of the storage devices 12 to generate support tickets comprising a collection of error logs associated with each respective storage device 12. The component 22 optionally combines 65 each of the support tickets into a single composite file for transmission. The component 22 transmits 66 the support tickets (such as in the form of the composite file, in a body of an email message, or by way of a hyperlink, for example) to the support organization.

Thus, improved backup storage apparatus and information sharing method or algorithm have been disclosed. It is to be understood that the above-described embodiments are merely illustrative of some of the many specific embodiments that represent applications of the principles described herein. Clearly, numerous and other arrangements can be readily devised by those skilled in the art without departing from the scope of the invention.

What is claimed is:

1. A tape library, comprising:
a controller;
a communication interface to couple to a backup server;
tape drives that are in communication with the controller;
an operator control panel disposed on a front panel of the tape library, the operator control panel in communication with the controller; and
an interface component that is in communication with the controller and communicates directly with a remotely located support organization that includes a remote computing system accessible through remote communication means, wherein the operator control panel displays a menu item that requests error logs be sent from the tape library to the support organization, and selection of the menu item by a user transmits a request to the interface component to query the tape drives, generate support tickets comprising the error logs, and transmit the support tickets directly from the tape library to the support organization without using the backup server.

2. The tape library recited in claim 1 wherein the support tickets are combined into a single composite file.

3. The tape library recited in claim 1 wherein the support tickets are transmitted in a body of an email message directly from the tape library to the support organization.

4. The tape library recited in claim 1 wherein the support tickets are transmitted by way of a hyperlink to the support organization.

5. The tape library recited in claim 1 wherein the errors logs are associated with the tape drives and backup applications are not shut down.

6. A tape library, comprising:
a controller;
a communication interface to couple to a backup server;
tape drive in communication with the controller; and
an operator control panel disposed on a front panel of the tape library, the operator control panel in communication with the controller, wherein the operator control panel displays a menu item that when selected by a user causes the tape library to generate a support ticket of error logs associated with the tape drive and to transmit the support ticket of error logs directly from the tape library to a remotely located support organization that includes a remote computing system accessible through remote communication means, without using the backup server.

7. The tape library recited in claim 6 wherein the operator control panel is a display on a front panel of the tape library and includes a graphical user interface with the menu item selectable to transmit the support ticket of error logs to the support organization.

8. The tape library recited in claim 6 wherein the support ticket of error logs is transmitted by way of a hyperlink to the support organization.

9. The tape library recited in claim 6 wherein the support ticket of error logs is transmitted to the support organization without shutting down backup applications.

10. A method comprising:
    providing a backup storage apparatus comprising a controller, a communication interface to couple to a backup server, an operator control panel disposed on a front panel of the backup storage apparatus that controls functions of and displays information regarding the backup storage apparatus, storage devices, and an interface component for communicating with a remotely located support organization that includes a remote computing system accessible through remote communication means;
    displaying a menu item on the operator control panel for requesting that error logs be sent from the backup storage apparatus to a support organization;
    selecting the menu item; and
    transmitting a request to the interface component to query each of the storage devices to generate a support ticket comprising a collection of error logs associated with the storage devices, and transmit the generated support tickets directly from the backup storage apparatus to the support organization without using the backup server.

11. The method recited in claim 10 wherein the support tickets are combined into a single composite file.

12. The method recited in claim 10 wherein the support tickets are transmitted in a body of an email message.

13. The method recited in claim 10 wherein the support tickets are transmitted by way of a hyperlink to the support organization.

14. The method recited in claim 10 wherein the controller controls loading and unloading of storage media into and from storage devices, and the operator control panel is coupled to the controller.

15. The system of claim 1, wherein remote communication between the communication interface component and the support organization is via email.

16. The system of claim 6, wherein remote communication between the communication interface component and the support organization is via email.

17. The method of claim 10, wherein remote communication between the communication interface component and the support organization is via email.

\* \* \* \* \*

UNITED STATES PATENT AND TRADEMARK OFFICE
CERTIFICATE OF CORRECTION

PATENT NO. : 8,688,821 B2
APPLICATION NO. : 11/259224
DATED : April 1, 2014
INVENTOR(S) : Curtis C. Ballard et al.

Page 1 of 1

It is certified that error appears in the above-identified patent and that said Letters Patent is hereby corrected as shown below:

In the Claims

In column 6, line 42, in Claim 5, delete "errors" and insert -- error --, therefor.

Signed and Sealed this
Twelfth Day of August, 2014

Michelle K. Lee
*Deputy Director of the United States Patent and Trademark Office*